US011834096B2

United States Patent
Robertson

(10) Patent No.: US 11,834,096 B2
(45) Date of Patent: Dec. 5, 2023

(54) SYSTEMS, APPARATUS, AND METHODS FOR STEERING A TOWED VEHICLE IN REVERSE

(71) Applicant: Toyota Motor Engineering & Manufacturing North America, Inc., Plano, TX (US)

(72) Inventor: Stephen L. Robertson, Surprise, AZ (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 211 days.

(21) Appl. No.: 17/192,858

(22) Filed: Mar. 4, 2021

(65) Prior Publication Data

US 2022/0281522 A1 Sep. 8, 2022

(51) Int. Cl.
*B62D 13/06* (2006.01)
*B60D 1/24* (2006.01)

(52) U.S. Cl.
CPC ............. *B62D 13/06* (2013.01); *B60D 1/245* (2013.01)

(58) Field of Classification Search
CPC ........ B62D 13/06; B62D 12/02; B60D 1/245; B60D 1/62
See application file for complete search history.

(56) References Cited

U.S. PATENT DOCUMENTS

| | | | | |
|---|---|---|---|---|
| 4,345,775 | A * | 8/1982 | Merrifield | B62D 13/06 |
| | | | | 280/474 |
| 6,609,766 | B1* | 8/2003 | Chesnut | B60T 11/107 |
| | | | | 188/3 R |
| 9,004,519 | B1* | 4/2015 | Beech | B62D 13/06 |
| | | | | 280/442 |
| 9,840,277 | B1* | 12/2017 | Beech | B60D 1/62 |
| 9,987,965 | B2* | 6/2018 | Flathers | B62D 53/10 |
| 10,926,796 | B1* | 2/2021 | Beech | B60D 1/62 |
| 11,285,964 | B2* | 3/2022 | Norstad | B60T 8/00 |
| 2004/0188968 | A1* | 9/2004 | Warner | B62D 13/04 |
| | | | | 280/89.11 |
| 2011/0212805 | A1* | 9/2011 | Hilker | F16H 57/0483 |
| | | | | 475/160 |
| 2017/0217490 | A1* | 8/2017 | Behrens | B60G 11/27 |
| 2018/0180164 | A1* | 6/2018 | Hagino | B60K 6/445 |
| 2018/0297555 | A1* | 10/2018 | Simon | B62D 5/001 |
| 2019/0077457 | A1* | 3/2019 | Xu | B62D 15/028 |
| 2019/0210646 | A1* | 7/2019 | Shepherd | F16F 1/041 |
| 2019/0367075 | A1* | 12/2019 | Kodera | B62D 5/046 |
| 2021/0179168 | A1* | 6/2021 | Zeiler | B62D 15/0215 |
| 2021/0403080 | A1* | 12/2021 | Froese | B62D 13/06 |

* cited by examiner

*Primary Examiner* — Sze-Hon Kong
(74) *Attorney, Agent, or Firm* — SNELL & WILMER LLP

(57) ABSTRACT

Systems, apparatus, and methods for steering one or more wheels of a flat-towed vehicle moving in reverse. A system may include a power steering mechanism configured to steer the one or more wheels. The system may further include a connector configured to carry one or more signals from a towing vehicle to the flat-towed vehicle. The system may further include an electronic control unit (ECU) coupled to the power steering mechanism and the connector. The ECU may receive a signal that one or more reverse lights of the towing vehicle are lit or on. The ECU may be configured to actuate the power steering mechanism to steer the one or more wheels to a straight position upon receiving the signal.

20 Claims, 4 Drawing Sheets

SYSTEMS, APPARATUS, AND METHODS FOR STEERING A TOWED VEHICLE IN REVERSE

BACKGROUND

1. Field

The present disclosure is directed to systems, apparatus, and methods for steering a towed vehicle, specifically steering a flat-towed vehicle moving in reverse.

2. Description of the Related Art

Vehicles capable of towing other vehicles (e.g., motorhomes, trailers, recreational vehicles (RVs), trucks, etc.) often flat-tow the other vehicles. Generally, flat-towing, also known as four-down towing or dinghy towing, involves attaching a tow bar between the towing vehicle and the flat-towed vehicle (e.g., a car) and allowing the flat-towed vehicle to roll along behind the towing vehicle on its wheels while placed in a neutral gear. The steering system of the flat-towed vehicle is free to turn with the towing vehicle and follow it. However, the flat-towed vehicle may jackknife behind the towing vehicle when reversing due to the steering geometry steering the front wheels of the flat-towed vehicle to a right or left travel lock. Hence, the flat-towed vehicle may only be reversed for a short distance before further reversing without damage to the tow bar and/or the flat-towed and/or the towing vehicle is prevented.

As such, there is a need for systems, apparatus, and methods for steering a flat-towed vehicle moving in reverse.

SUMMARY

Systems, apparatus, and methods for steering wheels of a flat-towed vehicle moving in reverse. A system may include a power steering mechanism to steer the wheels. The system may further include a connector to carry a signal from a towing vehicle to the flat-towed vehicle. The system may further include an electronic control unit (ECU) coupled to the power steering mechanism and the connector. The ECU may receive a signal that reverse lights of the towing vehicle are lit or on. The ECU may actuate the power steering mechanism to steer the wheels to a straight position upon receiving the signal.

In accordance with an embodiment of the present disclosure, there may be a steering system for steering one or more wheels of a flat-towed vehicle moving in reverse. The steering system may include a power steering mechanism configured to steer the one or more wheels. The power steering mechanism may include an electric motor to steer the one or more wheels. The one or more wheels may be one or more front wheels of the flat-towed vehicle. The steering system may further include a connector configured to carry one or more signals from a towing vehicle to the flat-towed vehicle. The steering system may further include an ECU coupled to the power steering mechanism and the connector. The ECU may be configured to actuate the power steering mechanism to steer the one or more wheels to a straight position upon receiving a signal of a plurality of signals that one or more reverse lights of the towing vehicle are lit or on. The plurality of signals may include brake or battery power signals. The steering system may further include a tow bar configured to couple the towing vehicle to the flat-towed vehicle and move the flat-towed vehicle in reverse when the towing vehicle is moving in reverse.

The ECU may be configured to power off the power steering mechanism upon ceasing to receive the signal. The flat-towed vehicle may have a hybrid transaxle. The hybrid transaxle may be splash lubricated to prevent the hybrid transaxle from drying when the one or more wheels of the flat-towed vehicle are rotating to move the flat-towed vehicle.

In accordance with another embodiment of the present disclosure, there may be a vehicle capable of self-steering when being flat-towed in reverse by a towing vehicle. The vehicle may include two or more wheels. The vehicle may further have a power steering mechanism configured to steer at least one wheel of the two or more wheels. The power steering mechanism may include an electric motor to steer the one or more wheels. The at least one or more wheels may be a front wheel. The vehicle may further have an ECU coupled to the power steering mechanism. The ECU may be configured to receive a signal that one or more reverse lights of the towing vehicle are lit or on and actuate the power steering mechanism to steer the at least one wheel to a straight position upon receiving the signal.

The signal may be received from a connector coupled between the ECU and the towing vehicle. The signal may be a first signal of a plurality of signals. The ECU may be configured to receive the plurality of signals. The plurality of signals may include brake or battery power signals. The ECU may be configured to power off the power steering mechanism upon ceasing to receive the signal.

The vehicle may be coupled to the towing vehicle with a tow bar. The tow bar may be configured to move the vehicle in reverse when the towing vehicle is moving in reverse. The vehicle may have a hybrid transaxle. The hybrid transaxle may be splash lubricated to prevent the hybrid transaxle from drying when the two or more wheels are rotating to move the vehicle.

In accordance with another embodiment of the current disclosure, there may be a method for steering one or more wheels of a flat-towed vehicle moving in reverse. The method may include providing a power steering mechanism configured to steer the one or more wheels. The one or more wheels may be one or more front wheels of the flat-towed vehicle. The method may further include providing a connector configured to carry one or more signals from a towing vehicle to the flat-towed vehicle. The method may further include receiving a signal of a plurality of signals, by an ECU, that one or more reverse lights of the towing vehicle are lit or on. The plurality of signals may include brake or battery power signals. The method may further include actuating, by the ECU, the power steering mechanism. The method may further include steering, by the power steering mechanism, the one or more wheels to a straight position. The ECU may be configured to power off the power steering mechanism upon ceasing to receive the signal. The method may further include moving the flat-towed vehicle in reverse when the towing vehicle is moving in reverse by a tow bar.

BRIEF DESCRIPTION OF THE DRAWINGS

Other systems, methods, features, and advantages of the present disclosure will be apparent to one skilled in the art upon examination of the following figures and detailed description. Component parts shown in the drawings are not necessarily to scale and may be exaggerated to better illustrate the important features of the present disclosure.

DETAILED DESCRIPTION

The systems, apparatus, and methods described herein steer a flat-towed vehicle (e.g. an automobile, an off-road vehicle, a motorcycle) moving in reverse. The flat-towed vehicle may be attached to a towing vehicle (e.g., motorhomes, trailers, RVs, trucks, etc.) with a tow bar. The flat-towed vehicle may include a power steering mechanism to steer the wheels. The steered wheels may be front wheels. The power steering mechanism may be an electric power steering mechanism. The flat-towed vehicle may be electrically and/or electronically connected to the towing vehicle with a connector to carry a signal from the towing vehicle to the flat-towed vehicle. The flat-towed vehicle may include an ECU coupled to the power steering mechanism and the connector. The ECU may receive a signal that reverse lights of the towing vehicle are lit or on. The ECU may advantageously actuate the power steering mechanism to steer the wheels to a straight position upon receiving the signal to prevent the flat-towed vehicle from jackknifing, or, in other words, bending into a V-shape in an uncontrolled skidding movement. The flat-towed vehicle may be an autonomous or semi-autonomous vehicle with self-driving capabilities. The term "driver" may be interchanged with "passenger" when referring to autonomous or semi-autonomous vehicles.

Figure 1:
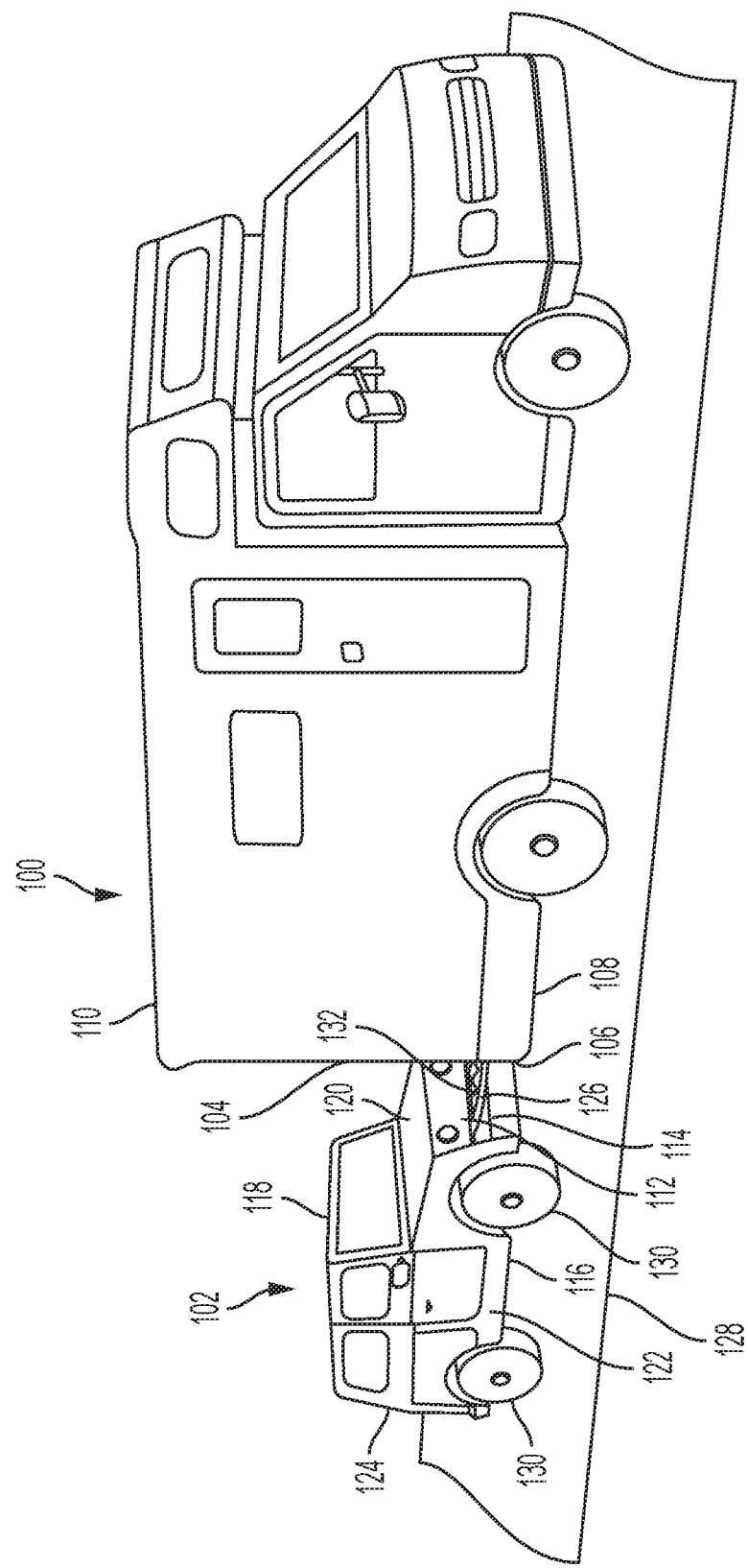
FIG. 1 illustrates a perspective view of a towing vehicle flat-towing a towed vehicle according to an aspect of the present disclosure.

FIG. 1 illustrates a perspective view of a towing vehicle 100 flat-towing a towed vehicle 102 according to an aspect of the present disclosure. The towing vehicle 100 is a conveyance capable of transporting a person, an object, or a permanently or temporarily affixed apparatus. The towing vehicle 100 may be an RV as shown in FIG. 1. In other examples, the towing vehicle 100 may be a motorhome, a self-propelled trailer, a truck, a van, a sports utility vehicle (SUV), an automobile, or any other motor or battery driven vehicle having a requisite towing capacity to tow the towed vehicle 102. The towing vehicle 100 may have an automatic or manual transmission. By example and not limitation, the towing vehicle 100 may be an electric vehicle, a hybrid vehicle, a plug-in hybrid vehicle, a fuel cell vehicle, or any other type of vehicle that includes a motor/generator. The towing vehicle 100 may have a rear end 104 where the towed vehicle 102 may be coupled to. More particularly, the towed vehicle 102 may be coupled to a rear bumper 106 of the towing vehicle 100 as shown in FIG. 1. In some embodiments, the towed vehicle 102 may be coupled to a bottom 108, a roof 110, a tailgate, or a trunk of the towing vehicle 100.

The towed vehicle 102 is a conveyance capable of transporting a person, an object, or a permanently or temporarily affixed apparatus. The towed vehicle 102 may be a utility terrain vehicle (UTV) as shown in FIG. 1. In other examples, the towed vehicle 102 may be a motor or battery driven vehicle having a four-wheel drive feature and a manual transfer case, all-wheel drive, a front wheel drive and a manual transmission, a rear manual drive and a manual transmission, or an automatic transmission and a transmission disconnect. In some embodiments, the towed vehicle 102 may have a hybrid transaxle. The transmission of the towed vehicle 102 may be splash lubricated to prevent damage to the transmission while the motor or the battery is not running. By example and not limitation, the towed vehicle 102 may be an electric vehicle, a hybrid vehicle, a plug-in hybrid vehicle, a fuel cell vehicle, or any other type of vehicle that includes a motor/generator. The towed vehicle 102 may have a front end 112 where the towing vehicle 100 may be coupled thereto. More particularly, the towing vehicle 100 may be coupled to a front bumper 114 of the towed vehicle 102 as shown in FIG. 1. In some embodiments, the towed vehicle 102 may be coupled to a bottom 116, a roof 118, a hood 120, a side 122, or a rear 124 of the towed vehicle. The coupling of the towed vehicle 102 to the towing vehicle 100 may be facilitated by a tow bar 126. The tow bar 126 may be a conventional Y-shaped bar (see FIGS. 2A-2C). Other examples of the tow bar 126 include an electric, a non-binding, a swan-neck, a removable, or a retractable tow bar 126. A tow bar hitch attachable to the towing vehicle 100 and/or the towed vehicle 102 may provide or receive the tow bar 126. In some embodiments, the tow bar 126 may be attached to holes or shackles on the towed vehicle 102. In some embodiments, a tow rope may be used in lieu of or in addition to the tow bar 126. A tow bar stabilizer may be used alongside the tow bar 126 to mitigate wobbling, swaying, and pitching while the towing vehicle 100 and the towed vehicle 102 are in motion.

The towing vehicle 100 and the towed vehicle 102 are depicted on a road 128. All wheels 130 of the towed vehicle 102, except any spare wheels, may directly contact the road 128. The towed vehicle 102 may have four wheels 130. In other examples, the towed vehicle 102 may have more or less wheels, such as two, three, or six.

The towing vehicle 100 and the towed vehicle 102 may be electronically coupled. The electrical and/or electronic connection may be facilitated by a connector 132. The connector 132 may transmit one or more signals from the towing vehicle 100 to the towed vehicle 102. In some embodiments, the connector 132 may also transmit one or more signals from the towed vehicle 102 to the towing vehicle 100. The connector 132 may be a wired or a wireless connector 132. For example, the one or more signals may be transmitted via a cable, a cord, Bluetooth, Infrared (IR), WiFi, and/or the like. A cable connector 132 is shown in FIG. 1 by example. The connector 132 may include multiple wires. By example, the connector 132 may be a 7-pin connector. The connector 132 may be flexible or rigid. The one or more signals may include brake, battery power, and reverse light, or tail light signals. For example, a signal may indicate that the reverse lights 134 (see FIGS. 2A-2C) of the towing vehicle 100 are on. The reverse lights 134 being on may indicate that the towing vehicle 100 is driving in reverse. The signal ceasing to be received may indicate that the reverse lights 134 of the towing vehicle 100 are off. The reverse lights 134 being off may indicate that the towing vehicle 100 is no longer driving in reverse (i.e., the towing vehicle 100 is parked, stopped, neutral, or driving forward).

Figure 2C:
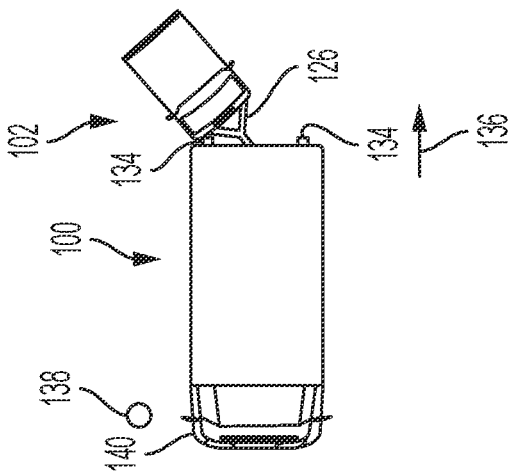
FIG. 2C illustrates a top view of the towing vehicle and the towed vehicle of FIG. 1 jackknifed while moving in reverse according to an aspect of the present disclosure.
Figure 2B:
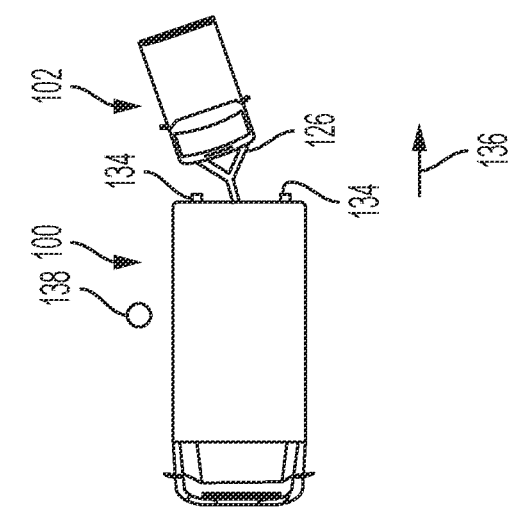
FIG. 2B illustrates a top view of the towing vehicle and the towed vehicle of FIG. 1 moving in reverse for a short distance according to an aspect of the present disclosure.
Figure 2A:
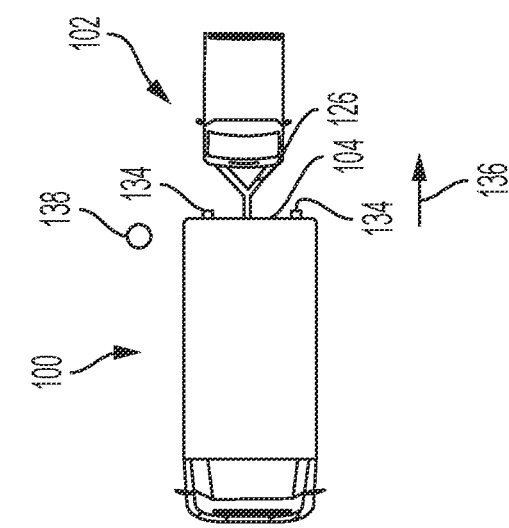
FIG. 2A illustrates a top view of the towing vehicle and the towed vehicle of FIG. 1 beginning to move in reverse according to an aspect of the present disclosure.

FIG. 2A illustrates a top view of the towing vehicle 100 and the towed vehicle 102 beginning to move in reverse, or in the direction of arrow 136, according to an aspect of the present disclosure. A stationary object 138 is depicted next to the towing vehicle 100 to illustrate the change in the position of the towing vehicle 100 and the towed vehicle 102 in the direction of arrow 136 throughout FIGS. 2A-2C. Initially, the object 138 may be aligned with the rear end 104 of the towing vehicle 100. When the towed vehicle 102 has a power steering mechanism that is configured to straighten the towed vehicle 102 when the towing vehicle 100 is reversed, the towed vehicle 102 may maintain its position shown in FIG. 2A irrespective of the traveled distance in the direction of arrow 136. However, if the towed vehicle 102 does not have the steering correction features discussed in the present disclosure or has said features disabled, then the towed vehicle 102 may gradually jackknife with respect to the towing vehicle 100 as the towing vehicle 100 reverses further as shown in FIGS. 2B-2C.

FIG. 2B illustrates a top view of the towing vehicle 100 and the towed vehicle 102 moving in reverse for a short distance according to an aspect of the present disclosure. The stationary object 138 is approximately aligned with a mid-section of the towing vehicle 100 due to the towing vehicle reversing in the direction of arrow 136. The tow bar 126 and the towed vehicle 102 begin to come out of initial alignment shown in FIG. 2A and slip either to the left or to the right. The slipping may be due to tire caster, or a forward or rearward tilt of the steering axis. In FIG. 2B, the tow bar 126 and the towed vehicle 102 are shown slipping to the right. If the power steering mechanism of the current disclosure was in place, the alignment of the towed vehicle 102 with respect to the towing vehicle 100 would still be as in FIG. 2A despite having traveled a distance in reverse.

FIG. 2C illustrates a top view of the towing vehicle 100 and the towed vehicle 102 jackknifed while moving in reverse according to an aspect of the present disclosure. The stationary object 138 is approximately aligned with a cockpit 140 at the front of the towing vehicle 100 due to the towing vehicle 100 reversing further in the direction of arrow 136. The tow bar 126 and the towed vehicle 102 are out of the initial alignment shown in FIG. 2A and have slipped to the right to create a V-shape with the towing vehicle 100, or, said differently, have jackknifed. In another example, the tow bar 126 and the towed vehicle 102 may slip and jackknife to the left. When jackknifing occurs, the towing vehicle 100 may not reverse further without damaging the tow bar 126, the connector 132, the towing vehicle 100, the towed vehicle 102, and/or any other contact between the towing vehicle 100 and the towed vehicle 102. If the power steering mechanism of the current disclosure was in place, the alignment of the towed vehicle 102 with respect to the towing vehicle 100 would still be as in FIG. 2A despite having traveled a distance further than that shown in FIG. 2B in reverse.

Figure 3:
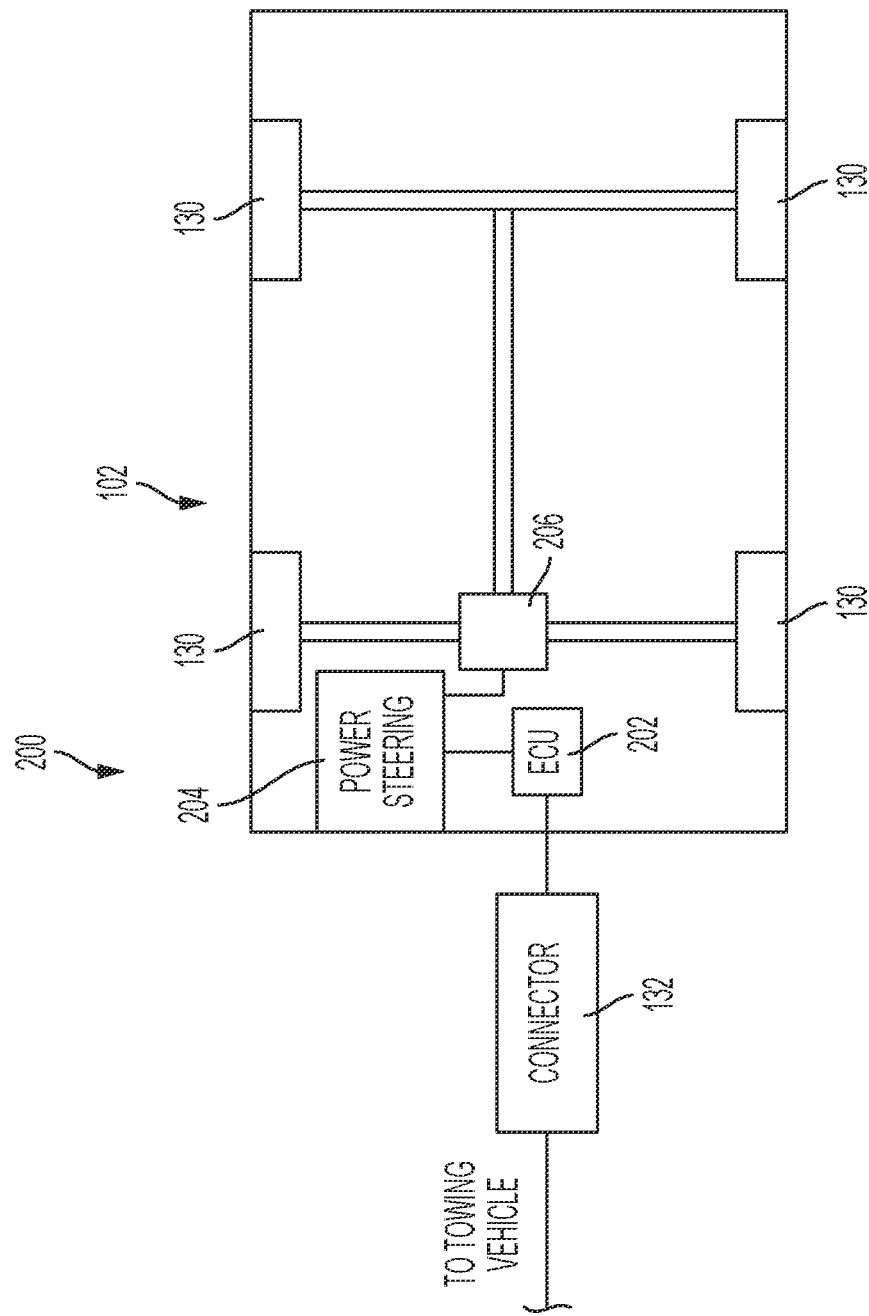
FIG. 3 illustrates a block diagram showing components of a system for steering the towed vehicle of FIG. 1 moving in reverse according to an aspect of the present disclosure.

FIG. 3 illustrates a block diagram showing components of a system 200 for steering the towed vehicle 102 moving in reverse according to an aspect of the present disclosure. The system 200 may include the towed vehicle 102, an ECU 202, a power steering mechanism 204, a transaxle 206, and/or the connector 132.

The ECU 202 may be programmed to control one or more operations of the towed vehicle 102. The ECU 202 may be implemented as a single ECU 202 or in multiple ECUs 202. The ECU 202 may be electrically coupled to some or all of the components of the towed vehicle 102. In some embodiments, the ECU 202 is a central ECU configured to control one or more operations of the entire towed vehicle 102. In some embodiments, the ECU 202 is multiple ECUs located within the towed vehicle 102 and each configured to control one or more local operations of the towed vehicle 102. In some embodiments, the ECU 202 is one or more computer processors or controllers configured to execute instructions stored in a non-transitory memory. The memory may store machine-readable instructions usable by the ECU 202 and may store other data as requested by the ECU 202.

The power steering mechanism 204 may steer the towed vehicle 102 without driver intervention. The power steering mechanism 204 may steer the wheels 130 of the towed vehicle 102 to a straight position when the towing vehicle 100 (see FIG. 1) is reversing to prevent jackknifing. The power steering mechanism 204 may thereby counteract geometric forces on the wheels 130 causing them to turn right or left. The power steering mechanism 204 may have an electric motor that applies assistive torque to a steering gear or a steering column to steer the wheels 130. The electric motor may draw energy from an electrical system of the towed vehicle 102 or the towing vehicle 100.

The transaxle 206 may combine the functions of a transmission, axle, and differential into a singular integrated assembly. In some embodiments, there may be a transmission, axle, and differential as separate components. The transaxle 206 may connect to the wheels 130. The transaxle 206 may be automatic or manual. The transaxle 206 may be a hybrid transaxle that allows the towed vehicle 102 to run on an electric motor. The transaxle 206 may be splash lubricated. The splash lubrication may prevent the transaxle 206 from drying when the wheels of the towed vehicle 102 are rotating as being towed. Drying of the transaxle 206 may cause one or more components of the towed vehicle 102 to malfunction (e.g., mechanical failure).

The connector 132 may transmit one or more signals from the towing vehicle 100 to the towed vehicle 102. The one or more signals may include brake, battery power, and reverse light, and/or tail light signals. The connector 132 may be coupled to the ECU 202. The connector 132 may transmit the one or more signals directly to the ECU 202. When the ECU 202 receives a signal indicating that the reverse lights 134 (see FIGS. 2A-2C) of the towing vehicle 100 are on, the ECU 202 may actuate the power steering mechanism 204 to steer the wheels 130 to a straight position. The steered wheels 130 may be a front wheel or wheels. In some embodiments, the ECU 202 may be coupled to one or more sensors that determine an amount of torque to be generated by the motor of the power steering mechanism 204 to straighten the front wheel or wheels. The determination may be based on the speed the towed vehicle 102 is being towed, type of terrain, terrain conditions, and/or the like detected by the one or more sensors. In some embodiments, the ECU 202 may be coupled to one or more sensors that detect an angle between a straight position and a turned position of the front wheel or wheels based on the steering geometry. The ECU 202 may actuate the power steering mechanism 204 such that a requisite amount of torque by the motor of the power steering mechanism 204 is applied to steer the front wheel or wheels in the amount of the detected angle in an opposite direction. By doing so, the front wheel or wheels may be maintained straight or be in a straight position.

The reverse lights 134 being on may indicate that the towing vehicle 100 is driving in reverse. The signal ceasing to be received may indicate that the reverse lights 134 of the towing vehicle 100 are off. The reverse lights 134 being off may indicate that the towing vehicle 100 is no longer driving in reverse (i.e., the towing vehicle 100 is parked, stopped, neutral, or driving forward). When the towing vehicle 100 is no longer in reverse, the ECU 202 may automatically shut off the power steering mechanism 204 to stop straightening the wheels 130.

Figure 4:
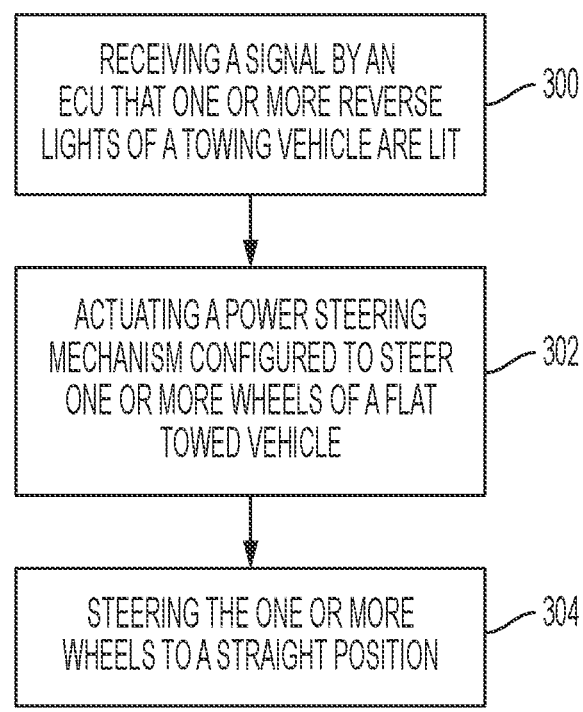
FIG. 4 illustrates a flow chart of a method for steering one or more wheels of the towed vehicle of FIG. 1 moving in reverse according to an aspect of the present disclosure.

FIG. 4 illustrates a flow chart of a method for steering one or more wheels 130 of the towed vehicle 102 (see FIG. 1) moving in reverse according to an aspect of the present disclosure. In block 300, the method may receive a signal by the ECU 202 (see FIG. 3) that one or more reverse lights 134 (see FIGS. 2A-2C) of the towing vehicle 100 (see FIG. 1) are lit or on. The towing vehicle 100 may move the towed vehicle 102 in reverse when the towing vehicle 100 is moving in reverse via the tow bar 126. The signal may be transmitted from the towing vehicle 100 by the connector 132 discussed in FIGS. 1 and 3. In some embodiments, the method may receive a plurality of signals by the ECU 202. The plurality of signals may include brake and/or battery power signals. In block 302, the method may actuate the power steering mechanism 204 (see FIG. 3) configured to steer the one or more wheels 130 of the towed vehicle 102. The one or more wheels 130 may be front wheels. When actuated, the motor of the power steering mechanism 204 may rotate. In block 304, the method may steer the one or more wheels 130 to a straight position. The motor may apply torque on the steering gear or the steering column to straighten the one or more wheels 130. When the transmission of the signal indicating the reverse lights 134 are on stops, the ECU 202 may automatically power off the motor of the power steering mechanism 204.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A steering system for steering one or more wheels of a flat-towed vehicle moving in reverse, the steering system comprising:
    a connector configured to carry one or more signals from a towing vehicle to the flat-towed vehicle;
    a power steering mechanism configured to steer the one or more wheels independent of a tow bar connected between the towing vehicle and the flat-towed vehicle;
    a sensor configured to detect an angle between a straight position and a turned position of the one or more wheels based on a steering geometry; and
    an electronic control unit (ECU) coupled to the power steering mechanism, the connector, and the sensor, the ECU configured to actuate the power steering mechanism to steer the one or more wheels to a straight position with respect to the flat-towed vehicle upon receiving a signal of a plurality of signals that one or more reverse lights of the towing vehicle are on, and the ECU configured to actuate the power steering mechanism such that a requisite amount of torque is applied to steer the one or more wheels in the amount of the detected angle in an opposite direction.

2. The steering system of claim 1, wherein the one or more wheels are one or more front wheels of the flat-towed vehicle.

3. The steering system of claim 1, wherein the plurality of signals include brake or battery power signals.

4. The steering system of claim 1, wherein the ECU is configured to power off the power steering mechanism upon ceasing to receive the signal.

5. The steering system of claim 1, further comprising the tow bar configured to couple the towing vehicle to the flat-towed vehicle and move the flat-towed vehicle in reverse when the towing vehicle is moving in reverse.

6. The steering system of claim 1, wherein power steering mechanism includes an electric motor to steer the one or more wheels.

7. The steering system of claim 1, wherein the flat-towed vehicle has a hybrid transaxle that is splash lubricated to prevent the hybrid transaxle from drying when the one or more wheels of the flat-towed vehicle are rotating to move the flat-towed vehicle.

8. A vehicle capable of self-steering when being flat-towed in reverse by a towing vehicle, the vehicle comprising:
    two or more wheels;
    an axle coupled to at least one of the two or more wheels;
    a power steering mechanism configured to steer at least one wheel of the two or more wheels independent of a tow bar connected between the towing vehicle and the flat-towed vehicle;
    a sensor configured to detect an angle between a straight position and a turned position of the two or more wheels; and
    an electronic control unit (ECU) coupled to the power steering mechanism and the sensor, the ECU configured to receive a signal that one or more reverse lights of the towing vehicle are on and actuate the power steering mechanism to steer the at least one wheel to a straight position with respect to the vehicle upon receiving the signal, and the ECU configured to actuate the power steering mechanism such that a requisite amount of torque is applied to steer the two or more wheels in the amount of the detected angle in an opposite direction.

9. The vehicle of claim 8, wherein the signal is received from a connector coupled between the ECU and the towing vehicle.

10. The vehicle of claim 9, wherein the signal is a first signal of a plurality of signals and the ECU is configured to receive the plurality of signals, the plurality of signals including brake or battery power signals.

11. The vehicle of claim 8, wherein the ECU is configured to power off the power steering mechanism upon ceasing to receive the signal.

12. The vehicle of claim 8, wherein the at least one wheel of the two or more wheels is a front wheel.

13. The vehicle of claim 8, wherein the vehicle is coupled to the towing vehicle with a tow bar, the tow bar configured to move the vehicle in reverse when the towing vehicle is moving in reverse.

14. The vehicle of claim 8, wherein power steering mechanism includes an electric motor to steer the one or more wheels.

15. The vehicle of claim 8, wherein the vehicle has a hybrid transaxle that is splash lubricated to prevent the hybrid transaxle from drying when the two or more wheels are rotating to move the vehicle, wherein the hybrid transaxle includes the axle.

16. A method for steering one or more wheels of a flat-towed vehicle moving in reverse, the method comprising:
    providing a power steering mechanism configured to steer the one or more wheels independent of a tow bar connected between the towing vehicle and the flat-towed vehicle;

providing a connector configured to carry one or more signals from a towing vehicle to the flat-towed vehicle;

providing a sensor configured to detect an angle between a straight position and a turned position of the one or more wheels based on a steering geometry;

receiving a signal of a plurality of signals, by an electronic control unit (ECU), that one or more reverse lights of the towing vehicle are on;

actuating, by the ECU, the power steering mechanism such that a requisite amount of torque is applied to steer the one or more wheels in the amount of the detected angle in an opposite direction; and steering, by the power steering mechanism, the one or more wheels to a straight position with respect to the flat-towed vehicle.

17. The method of claim 16, wherein the one or more wheels are one or more front wheels of the flat-towed vehicle.

18. The method of claim 16, wherein the plurality of signals include brake or battery power signals.

19. The method of claim 16, wherein the ECU is configured to power off the power steering mechanism upon ceasing to receive the signal.

20. The method of claim 16, further comprising moving, by the tow bar, the flat-towed vehicle in reverse when the towing vehicle is moving in reverse.

* * * * *